(12) United States Patent
Hsu et al.

(10) Patent No.: US 11,556,350 B2
(45) Date of Patent: Jan. 17, 2023

(54) ELECTRONIC DEVICE AND METHOD FOR SETTING AT LEAST ONE SPECIFIED PIN READ DURING BOOTING STAGE WHEN CONFIGURATING A DISPLAY PANEL DYNAMICALLY

(71) Applicant: PEGATRON CORPORATION, Taipei (TW)

(72) Inventors: Ming-Huang Hsu, Taipei (TW); Jing-Rung Wang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 840 days.

(21) Appl. No.: 16/430,224

(22) Filed: Jun. 3, 2019

(65) Prior Publication Data

US 2019/0391820 A1    Dec. 26, 2019

(30) Foreign Application Priority Data

Jun. 21, 2018    (TW) .................. 107121272

(51) Int. Cl.
| | |
|---|---|
| *G06F 9/00* | (2006.01) |
| *G06F 9/4401* | (2018.01) |
| *G06F 16/245* | (2019.01) |
| *G09G 5/00* | (2006.01) |

(52) U.S. Cl.
CPC .......... *G06F 9/4411* (2013.01); *G06F 16/245* (2019.01); *G09G 5/006* (2013.01); *G09G 2320/08* (2013.01); *G09G 2330/026* (2013.01)

(58) Field of Classification Search
CPC .. G06F 9/4411; G06F 16/245; G06F 2320/08; G09G 5/006; G09G 2330/026
See application file for complete search history.

(56) References Cited

U.S. PATENT DOCUMENTS

| | | | | |
|---|---|---|---|---|
| 5,734,819 | A | * 3/1998 | Lewis ..................... | G06F 21/73 726/29 |
| 8,458,370 | B1 | * 6/2013 | Tsu ........................ | G06F 3/1454 370/465 |
| 2006/0109861 | A1 | * 5/2006 | Tsao ........................ | H04L 67/36 370/252 |
| 2006/0139285 | A1 | 6/2006 | Tsai | |
| 2008/0231624 | A1 | 9/2008 | Poon | |
| 2016/0103603 | A1 | * 4/2016 | Sirpal ................. | G06F 3/04847 345/173 |

FOREIGN PATENT DOCUMENTS

CN            103425059        12/2013

* cited by examiner

*Primary Examiner* — Tammara R Peyton
(74) *Attorney, Agent, or Firm* — J.C. Patents

(57) ABSTRACT

A method for setting a display panel dynamically and an electronic device are provided. In a booting stage of the electronic device, a display driver is executed, wherein a motherboard of the electronic device includes at least one specified pin, a storage device and a processor. A predetermined pin value is set in the at least one specified pin and read from the at least one specified pin of the motherboard through the display driver. A database is queried through the display driver and includes multiple reference pin values corresponding to multiple sets of parameter values. The set of parameter values corresponding to the predetermined pin value is obtained according to the reference pin values; and the display panel is initialized through the display driver using the set of parameter values corresponding to the predetermined pin value.

10 Claims, 2 Drawing Sheets

ELECTRONIC DEVICE AND METHOD FOR SETTING AT LEAST ONE SPECIFIED PIN READ DURING BOOTING STAGE WHEN CONFIGURATING A DISPLAY PANEL DYNAMICALLY

CROSS-REFERENCE TO RELATED APPLICATION

This application claims the priority benefit of Taiwan application serial no. 107121272, filed on Jun. 21, 2018. The entirety of the above-mentioned patent application is hereby incorporated by reference herein and made a part of this specification.

BACKGROUND

1. Technology Field

The present invention relates to a display panel initialization mechanism and, in particular, to a method for setting a display panel dynamically and an electronic device.

2. Description of Related Art

Most current liquid-crystal displays (LCD) are internally provided with a storage device, such as a programmable read-only memory (PROM) or an electrically-erasable programmable read-only memory (EEPROM), which is used for storing extended display identification data (EDID).

However, for an embedded device such as a smart phone or a table personal computer (tablet PC), in order to save costs, the EDID is not supported in a display panel of the embedded device. Therefore, the embedded device is unable to set the initialization parameters of the display panel dynamically by reading EDID.

In conventional methods, if a display panel is replaced due to the requirement of a project, there might be a problem with dynamically setting the initialization parameters. Therefore, operating system images corresponding to different display panels must exist. However, those images in various versions are required, resulting in a version control issue related to the images in a factory, and causing more processing procedures in maintenance.

SUMMARY

The disclosure provides a method for setting a display panel dynamically and an electronic device, which are capable of initializing different display panels dynamically.

The disclosure provides a method for setting a display panel dynamically, comprising: executing a display driver in a booting stage of the electronic device, wherein a motherboard of the electronic device includes at least one specified pin and a predetermined pin value is set in the at least one specified pin; reading the predetermined pin value from the at least one specified pin of the motherboard through the display driver; querying a database through the display driver, wherein the database comprises multiple reference pin values corresponding to multiple sets of parameter values; obtaining the set of parameter values corresponding to the predetermined pin value according to the multiple reference pin values; and initializing the display panel through the display driver by using the set of parameter values corresponding to the predetermined pin value.

In one embodiment of present invention, in the booting stage, the method further comprises: loading the display driver to a system memory from an operating system image, so as to execute the display driver.

In one embodiment of the present invention, the database is set in a storage space in a controller of the motherboard, while the step of querying the database through the display driver comprises: querying the storage space in the controller via a communication interface.

In one embodiment of the present invention, the step of querying the database through the display driver and obtaining the set of parameter values corresponding to the predetermined pin value according to the reference pin values comprises: finding out one of the reference pin values matching the predetermined pin value, and obtaining the set of parameter values corresponding to the predetermined pin value based on the reference pin value.

In one embodiment of the present invention, the parameter values include a resolution, a display interface, a clock frequency and a panel dimension.

In one embodiment of the present invention, the motherboard comprises a memory device used for storing the database.

An electronic device of the present invention comprises: a display panel, a display driver and a motherboard. The motherboard is coupled to the display panel. The motherboard comprises: at least one specified pin, a storage device and a processor. A predetermined pin value is set in the at least one specified pin. The storage device includes operating system images. The processor is coupled to the at least one specified pin and the storage device. In the booting stage of the electronic device, the processor executes the display driver; reads the predetermined pin value from the at least one specified pin of the motherboard through the display driver; queries a database through the display driver, wherein the database includes multiple reference pin values corresponding to the multiple sets of parameter values; obtains the set of parameter values corresponding to the predetermined pin value according to the aforementioned reference pin values; and initializes the display panel through the display driver by using the set of parameter values corresponding to the predetermined pin value.

Based on the above contents, according to the present invention, the predetermined pin value of the specified pin is read in the booting stage, so as to obtain the parameter values of the corresponding display panel, and therefore, initialization can be performed without changing the operating system images when different display panels exist.

In order to make the aforementioned features and advantages of the present invention comprehensible, embodiments accompanied with figures are described in detail below.

DETAILED DESCRIPTION

Figure 1:
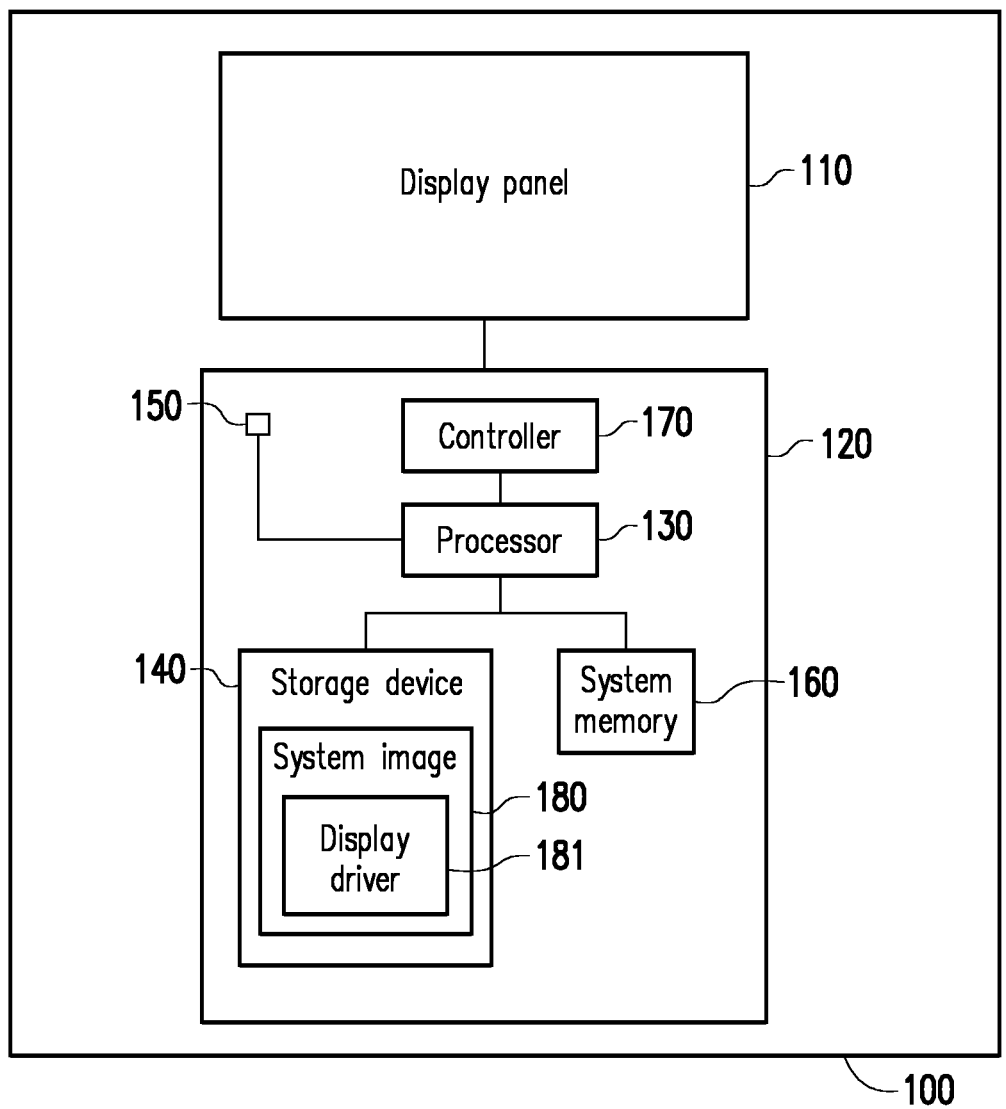
FIG. 1 is a block diagram of an electronic device according to one embodiment of the present invention.

FIG. 1 is a block diagram of an electronic device according to one embodiment of the present invention. Please refer to FIG. 1, the electronic device 100, for example, is an embedded device such as a smart phone or a table personal computer (tablet PC). The electronic device 100 comprises a display panel 110, a display driver 181 and a motherboard 120. The display driver 181 may be a driver program relevant to the display panel 110, and is installed in the electronic device 100. The display panel 110 is coupled to the motherboard 120.

Specifically, the motherboard 120 comprises a processor 130, a storage device 140, a specified pin 150, a system memory 160 and a controller 170. The processor 130 is coupled to the storage device 140, the specified pin 150, the system memory 160 and the controller 170. The quantity of the specified pin 150 is one or more, and is not limited here.

The processor 130, for example, is a central processing unit (CPU), a graphic processing unit (GPU), a physics processing unit (PPU), a programmable microprocessor, an embedded control chip, a digital signal processor (DSP), an application-specific integrated circuit (ASIC) or any other similar device.

The storage device 140, for example, is any type of programmable read-only memory (PROM) or electrically-erasable programmable read-only memory (EEPROM) or read-only memory (ROM), a flash memory, a secure digital memory card (SD), a hard disk or other similar devices or the combination of the devices. An operating system image 180 is stored in the storage device 140.

The specified pin 150, for example, is a general-purpose input/output (GPIO) pin. The system memory 160, for example, is a random access memory (RAM), and is a main memory for directly exchanging data with the processor 130. The system memory 160 is used for loading a variety of programs and data to be directly executed and compiled by the processor 130. The controller 170 is used for controlling the operation of the display panel 110. The controller 170 is coupled to the processor 130 via a communication interface.

Figure 2:
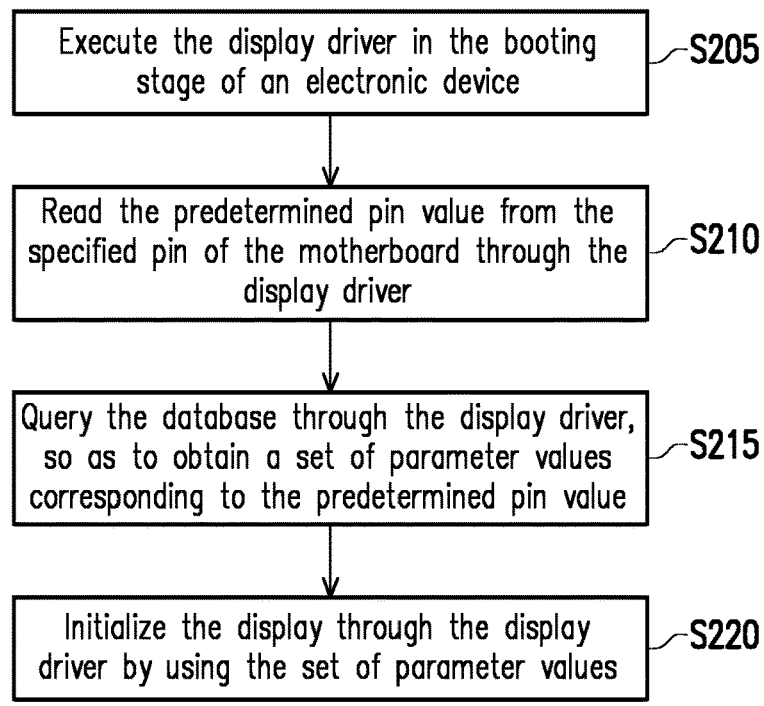
FIG. 2 is a flow diagram of a method for setting a display panel dynamically according to one embodiment of the present invention.

Each step of the method for setting a display panel dynamically is illustrated in cooperation with the electronic device 100 hereafter. FIG. 2 is a flow diagram of a method for setting a display panel dynamically according to one embodiment of the present invention. Please refer to FIG. 1 and FIG. 2, in step S205, in the booting stage of the electronic device 100, the processor 130 executes the display driver 181. In the booting stage, the processor 130 reads the operating system image 180 from the storage device 140, and loads the display driver 181 to the system memory 160 from the operating system image 180, so as to execute the display driver 181.

Then, in step S210, the predetermined pin value is read from the specified pin 150 of the motherboard 120 through the display driver 181. Furthermore, in step S215, the database is queried through the display driver 181, so as to obtain a set of parameter values corresponding to the predetermined pin value. For example, the display driver 181 queries the database in the storage space in the controller 170 via the communication interface of the controller 170. The database includes multiple reference pin values corresponding to multiple sets of parameter values, and the set of parameter values corresponding to the predetermined pin value is obtained according to the reference pin values. The communication interface, for example, is an inter-integrated circuit (I²C) interface. Afterwards, in step S220, the display 110 is initialized through the display driver 181 by using the set of parameter values.

Figure 3:
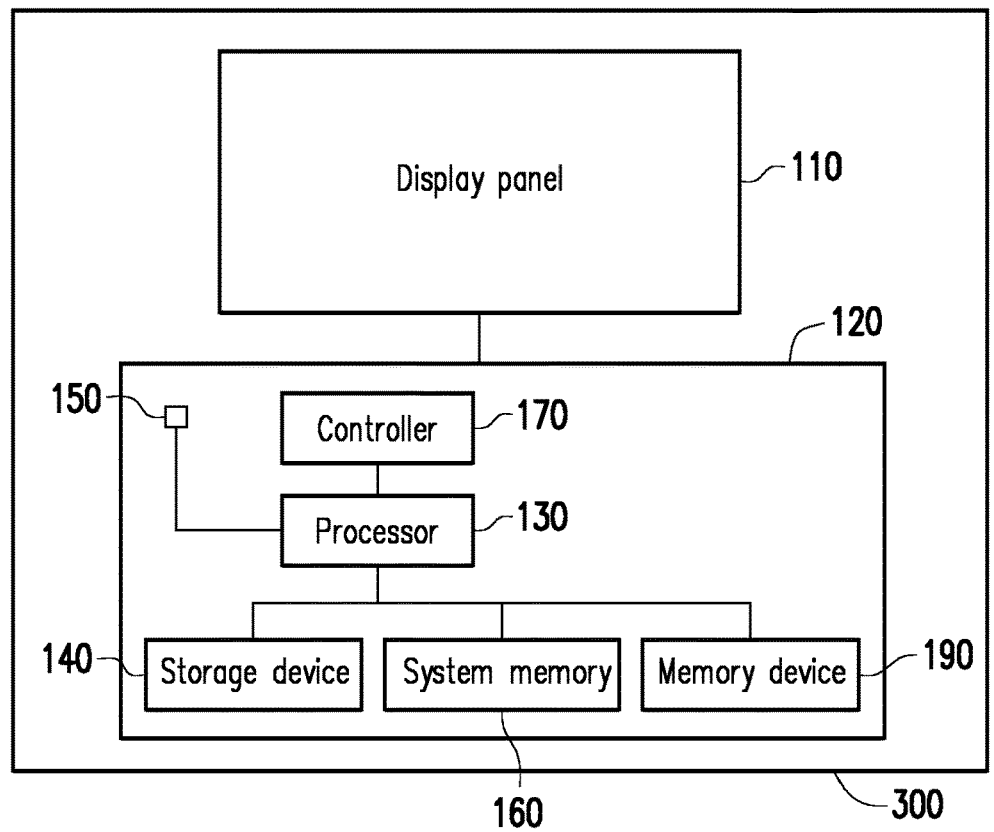
FIG. 3 is a block diagram of an electronic device according to another embodiment of the present invention.

In the present embodiment, the database is set in a storage space of the controller 170. While in other embodiments, another memory device may be set to store the database. FIG. 3 is a block diagram of an electronic device according to another embodiment of the present invention. In FIG. 3, a component with the same function as the electronic device 100 in FIG. 1 is labeled with the same number, and related illustration is omitted. As shown in FIG. 3, a motherboard 120 further comprises a memory device 190, and the database is stored in the memory device 190 which is separately disposed and coupled to the processor 130. The memory device 190, for example, is an electrically-erasable programmable read-only memory (EEPROM).

In hardware design, at least one specified pin 150 is designed on the motherboard 120. Furthermore, before delivery of the electronic device 100, the predetermined pin value is burned in the at least one specified pin 150. In the simple illustrations below, assuming that the quantity of the specified pin 150 is 2 and 4 types of display panels meet the development and application of the platform of the project, the developer will analyze the hardware information of various types of display panels and establish a lookup table, and a manufacturer of the display panels burns the hardware information into the controller 170.

In the electronic device 100, 4 combinations may be designed for 4 different types of display panels by using 2 specified pins 150 (illustrated by GPIO_A and GPIO_B below). Specifically, the 2 specified pins GPIO_A and GPIO_B have 4 combinations of the pin values, including a combination "00" of GPIO_A=0, GPIO_B=0; a combination "01" of GPIO_A=0 and GPIO_B=1; a combination "10" of GPIO_A=1 and GPIO_B=0; a combination "11" of GPIO_A=1 and GPIO_B=1, and one combination may correspond to one display panel. For example, "00" corresponds to the display panel of type A, "01" corresponds to the display panel of type B, "10" corresponds to the display panel of type C, and "11" corresponds to the display panel of type D. Furthermore, regarding the 4 types of display panels mentioned above, the corresponding parameter values are written into the motherboard 120 in advance.

TABLE 1

| Reference pin value | Resolution | | Color depth | Display interface | Clock frequency (MHz) | Panel dimension (inch) |
|---|---|---|---|---|---|---|
| 00 | 1280 | 800 | 24 bit | LVDS | 400 | 7 |
| 01 | 1280 | 960 | 24 bit | LVDS | 320 | 10 |
| 10 | 800 | 600 | 24 bit | RGB | 400 | 7 |
| 11 | 600 | 480 | 24 bit | HDMI | 320 | 4.8 |

Table 1 is a lookup table stored in the database. The lookup table has multiple reference pin values, and each reference pin value corresponds to one of all possible combinations of the pin values of the specified pins 150. By taking 2 specified pins 150 as an example, there are 4 combinations of the pin values, namely "00", "01", "10", and "11". Therefore, reference pin values are set to "00", "01", "10", and "11". Each reference pin value corresponds to a set of parameter values of one display panel type. It should be noted that the quantity of the specified pins 150 may be modified, depending on how many sets of the parameter values are. For example, when 6 sets of parameter values are available, 3 specified pins (that is, 8 pin value combinations) are required.

In the example shown in table 1, the parameters include resolution, color depth, display interface, clock frequency and panel dimension, but are not limited here. The display interface, for example, is a low-voltage differential signaling (LVDS) interface, an RGB interface or a high definition multimedia interface (HDMI).

Before the electronic device 100 is shipped out, the corresponding predetermined pin value is set for the specified pin 150 according to the display panel 110 used by the electronic device 100. For example, assuming that the reference pin values "00", "01", "10", and "11" correspond to the display panels of types A, B, C and D, respectively. Since the display panel 110 used by the electronic device 100 is type D, the combination "11" of GPIO_A=1 and GPIO_B=1 is burned into the specified pin 150 of the motherboard 120. That is, the predetermined pin value of the specified pin 150 is set to "11".

Accordingly, in the booting stage of the electronic device 100, after the display driver is loaded and executed, the predetermined pin value "11" is read from the specified pin 150 through the display driver, the reference pin value matching the predetermined pin value "11" is obtained by querying the database, so that the corresponding parameter values are obtained, that is, the resolution is 600×480, the color depth is 24 bit, the display interface adopts HDMI, the clock frequency is 320 MHz, and the panel dimension of the display panel 110 is 4.8 inch. Then, the display panel 110 is initialized by using the parameter values.

To sum up, according to the requirements of the project, the hardware information of display panels in different models related to the project is analyzed according to the specification, so as to establish a lookup table, and the lookup table is stored in the controller of the display panel.

The display driver obtains corresponding information from the lookup table by using the predetermined pin value set by the specified pin, so as to initialize the display panel. Accordingly, the parameter values of the display panel do not need to be written into the operating system image, and more other display panels suitable for the project may be guided by modifying the content in the lookup table, instead of modifying the operating system image.

Although the present invention has been disclosed above through the embodiments, the embodiments are not intended to limit the present invention, any person of ordinary skill in the art can make some alternation and modification without deviating from the spirit and scope of the present invention, and therefore, the protection scope of the present invention should be subject to the appended claims.

What is claimed is:

1. A method for setting a display panel dynamically in an electronic device, comprising:
   executing a display driver in a booting stage of the electronic device, wherein a motherboard of the electronic device comprises at least one specified pin, and a predetermined pin value is set in the at least one specified pin;
   reading the predetermined pin value from the at least one specified pin of the motherboard through the display driver;
   querying a database through the display driver, wherein the database comprises multiple reference pin values corresponding to multiple sets of parameter values; and obtaining the set of parameter values corresponding to the predetermined pin value according to the reference pin values; and
   initializing the display panel through the display driver by using the set of parameter values corresponding to the predetermined pin value,
   wherein step of querying the database through the display driver and obtaining the set of parameter values corresponding to the predetermined pin value according to the reference pin values comprises:
   finding out one of the reference pin values matching the predetermined pin value, and obtaining the set of parameter values corresponding to the predetermined pin value based on the reference pin value.

2. The method for setting a display panel dynamically according to claim 1, wherein in the booting stage, the method further comprises:
   loading the display driver to a system memory from an operating system image, so as to execute the display driver.

3. The method for setting a display panel dynamically according to claim 1, wherein the database is set in a storage space in a controller of the motherboard, while step of querying the database through the display driver comprises:
   querying the storage space in the controller via a communication interface.

4. The method for setting a display panel dynamically according to claim 1, wherein the set of parameter values comprises a resolution, a display interface, a clock frequency and a panel dimension.

5. The method for setting a display panel dynamically according to claim 1, wherein the motherboard comprises a memory device used for storing the database.

6. An electronic device, comprising:
   a display panel; and
   a display driver;
   a motherboard, which is coupled to the display panel, wherein the motherboard comprises:
   at least one specified pin, wherein a predetermined pin value is set in the at least one specified pin;
   a storage device, comprising an operating system image; and
   a processor, which is coupled to the at least one specified pin and the storage device, wherein in a booting stage of the electronic device, the processor executes the display driver; reads the predetermined pin value from the at least one specified pin of the motherboard through the display driver; queries a database through the display driver, wherein the database comprises multiple reference pin values corresponding to the multiple sets of parameter values; obtains the set of parameter values corresponding to the predetermined pin value according to the reference pin values; and initializes the display panel through the display driver by using the set of parameter values corresponding to the predetermined pin value,
   wherein the processor finds out one of the reference pin values matching the predetermined pin value through the display driver, and obtains the set of parameter values corresponding to the predetermined pin value based on the reference pin value.

7. The electronic device according to claim 6, wherein the motherboard further comprises: a system memory, which is coupled to the processor;
   wherein in the booting stage, the processor loads the display driver to the system memory from the operating system image, so as to execute the display driver.

8. The electronic device according to claim 6, wherein the motherboard further comprises a controller, which is coupled to the processor via a communication interface, and the database is set in a storage space of the controller,
   wherein the processor queries the storage space in the controller through the display driver via the communication interface.

9. The electronic device according to claim 6, wherein the set of parameter values comprises a resolution, a display interface, a clock frequency and a panel dimension.

10. The electronic device according to claim 6, wherein the motherboard further comprises a memory device used for storing the database.

\* \* \* \* \*